United States Patent [19]
Keller

[11] 3,730,555

[45] May 1, 1973

[54] PIVOT LIMITING ASSEMBLY

[76] Inventor: Anthony T. Keller, 10 Hilton Dr., West Haven, Conn. 06516

[22] Filed: Apr. 9, 1971

[21] Appl. No.: 132,793

Related U.S. Application Data

[63] Continuation-in-part of Ser. No. 39,062, May 20, 1970, abandoned.

[52] U.S. Cl. ............................................. 280/432
[51] Int. Cl. .............................................. B62d 53/06
[58] Field of Search .................................. 280/432

[56] References Cited

UNITED STATES PATENTS

| | | | |
|---|---|---|---|
| 1,073,453 | 9/1913 | Willison | 213/112 |
| 1,356,210 | 10/1920 | Kinne | 213/112 |
| 2,146,145 | 2/1939 | Huffman | 280/432 |
| 2,723,865 | 11/1955 | Leoni | 280/432 |
| 2,692,147 | 10/1954 | Whitney | 280/432 |
| 2,762,634 | 9/1956 | Moseley | 280/432 |
| 2,772,894 | 12/1956 | Oats | 280/432 |
| 3,302,957 | 2/1967 | Allen et al. | 280/432 |
| 2,773,701 | 12/1956 | Safko | 280/432 |

FOREIGN PATENTS OR APPLICATIONS

| | | | |
|---|---|---|---|
| 901,988 | 1/1954 | Germany | 280/432 |

Primary Examiner—Leo Friaglia
Attorney—Delio & Montgomery

[57] ABSTRACT

This disclosure relates to apparatus for use in combination with a towing vehicle and a towed vehicle pivotally connected in tandem. A pivot limiting assembly comprising a first pair of stop blocks is resiliently mounted one on each of the towing vehicles, and a second pair of stop blocks is supported one on each side of the forward portion of the towed vehicle and positioned to contact one of the first pair of stop blocks when the angle of pivot between the vehicles has reached a predetermined limit. The support members together with the stop blocks thereon are movable out of the line of contact with the second pair of stop blocks whereby the angle of pivot may exceed a predeter-mined limit.

15 Claims, 16 Drawing Figures

PATENTED MAY 1 1973 3,730,555
SHEET 1 OF 3
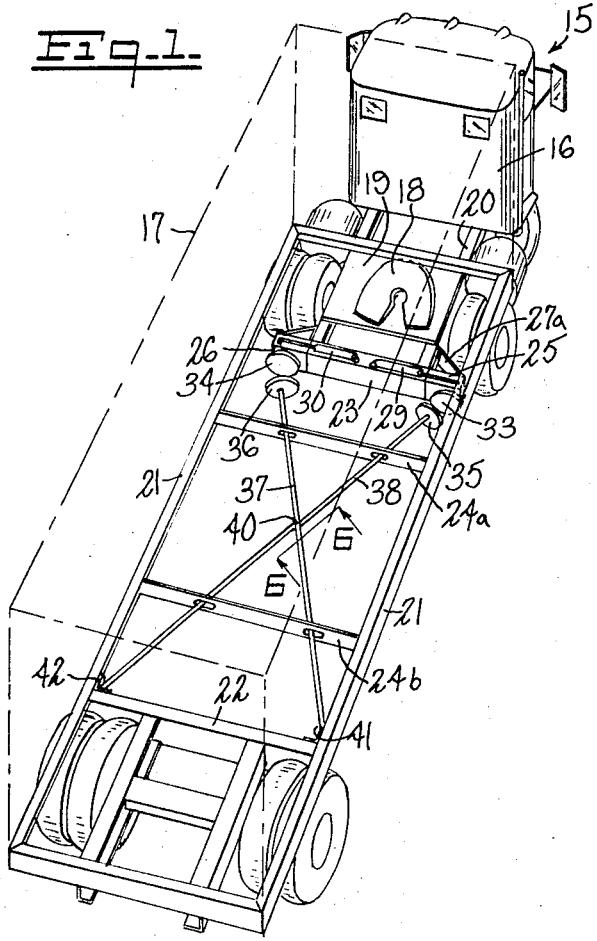
Fig.1.
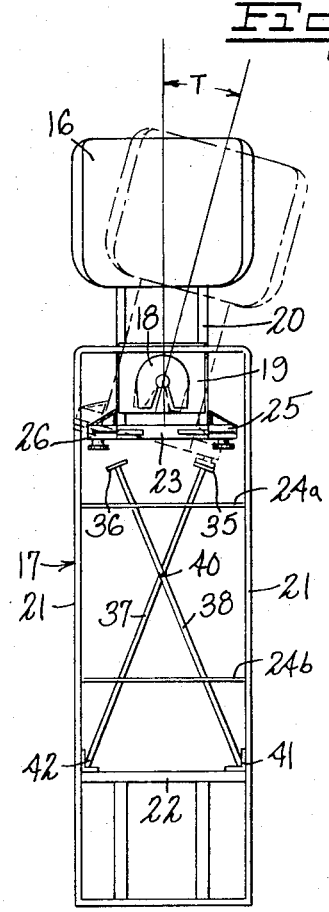
Fig.2.
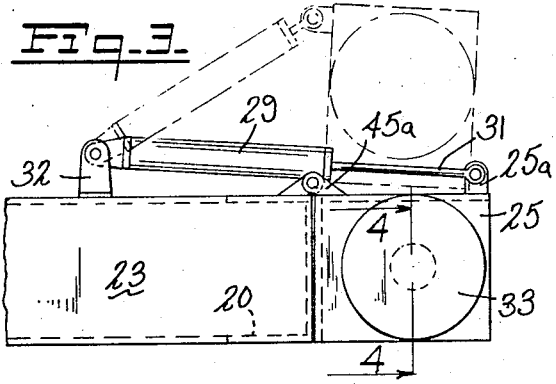
Fig.3.
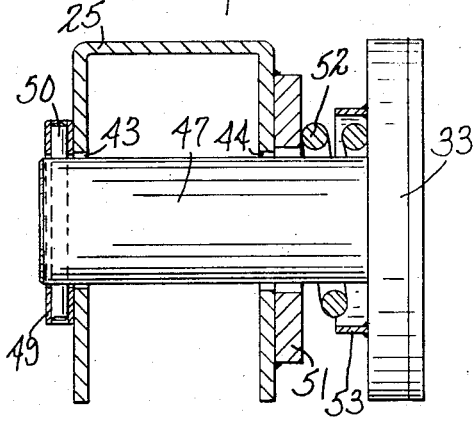
Fig.4.
Fig.5.
INVENTOR
Anthony T. Keller
BY DeLio and Montgomery
ATTORNEYS

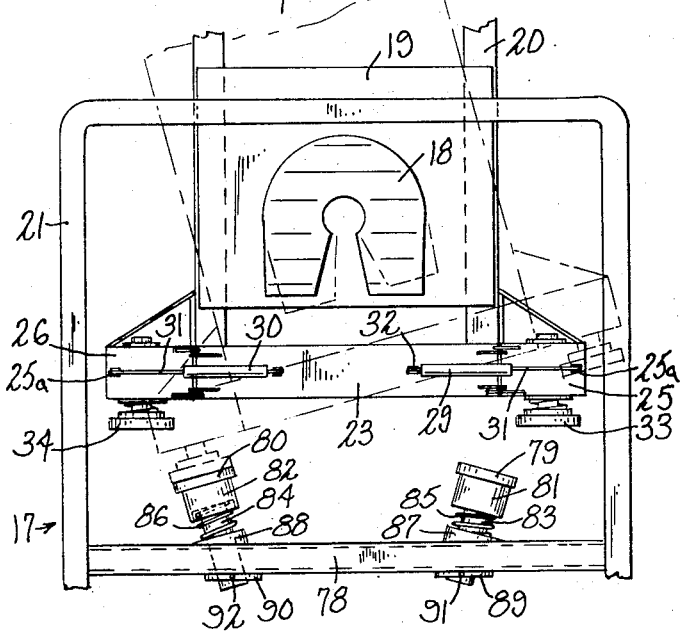

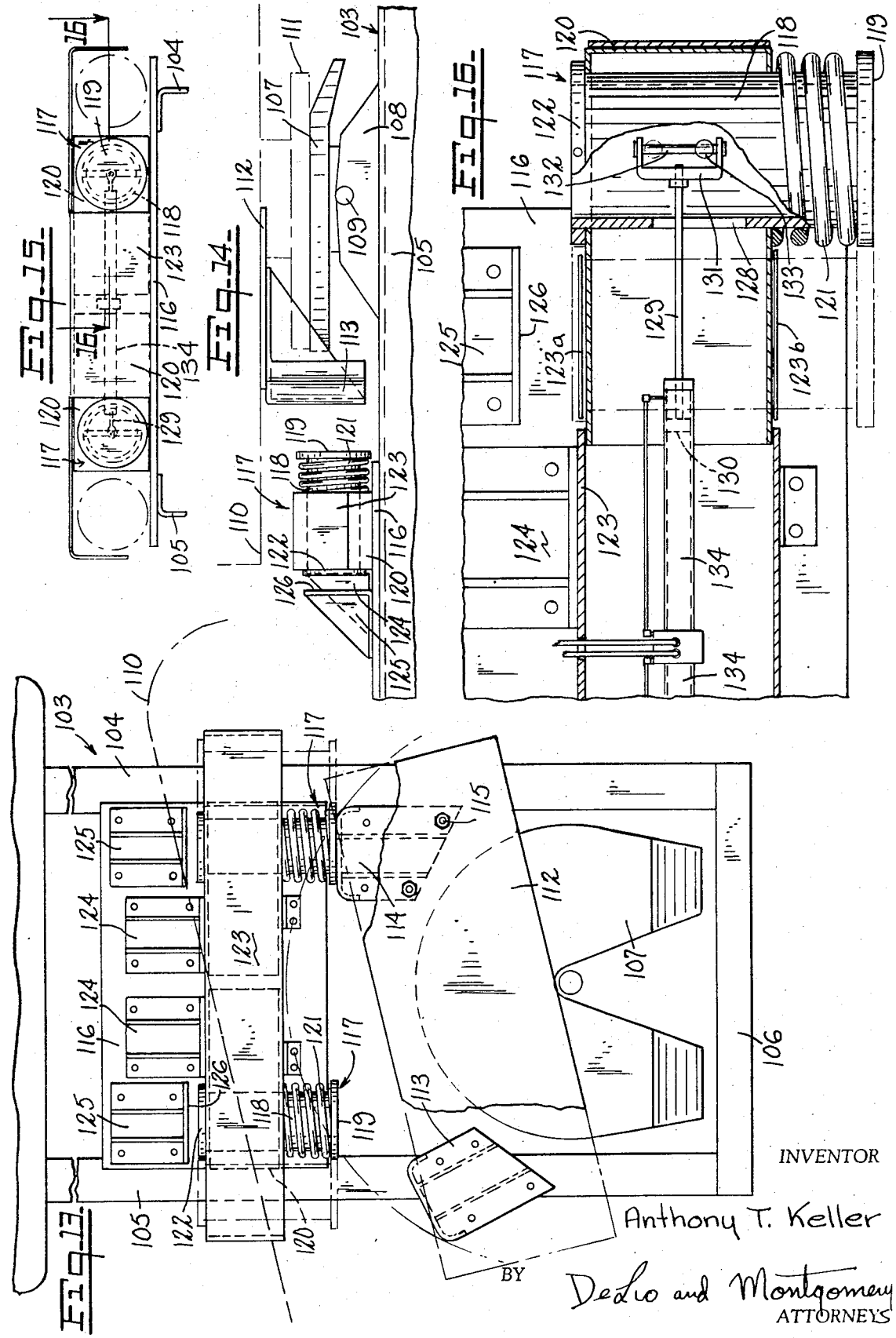

PIVOT LIMITING ASSEMBLY

This application is a continuation-in-part of copending application Ser. No. 39,062, filed May 20, 1970 and now abandoned.

This invention relates to an assembly for limiting the extent to which two vehicles connected in tandem can pivot or turn relative to each other at the point at which the vehicles are connected. More particularly, the invention relates to an assembly or device for preventing jackknifing of two vehicles connected in tandem.

A common hazard encountered on streets and especially on high-speed highways is the dislocation of two tandemly connected vehicles by what is known as "jackknifing". This dislocation is often abrupt and totally unexpected and is frequently accompanied by overturning of one or both of the vehicles. Jackknifing is not limited to commercial tractor-trailers or tractor-semi-trailers, but also involves house trailers and a towing automobile, automobile - or truck-utility trailer combinations, and other tandemly connected towing vehicle-towed vehicle combinations, including those involving a plurality of towed vehicles. Jackknifing is caused primarily by an abrupt turn, skid or sway of the towed or towing vehicle such that usually the momentum of the towed vehicle is in a direction different from that of the towing vehicle, with the result that one or both vehicles are thrown off the line of travel and skid sideways or even overturn.

Various means have been proposed to prevent or minimize tendency to jackknifing. These efforts are usually based on some positive connecting means between a towing and towed vehicle whereby an auxiliary connection is achieved. Such devices are inconvenient due to the necessity of disconnecting them when the primary connector or hitch is removed. While simple stop block mechanisms have also been proposed, not requiring an additional connection between the vehicles, such devices have not met with favor because of their excessive rigidity and non-adjustability, particularly when it is desired to greatly increase the angle of pivot of the vehicles relative to each other for parking and docking. Moreover, simple stop block devices heretofore have not been capable of dissipating the force of contact and have either failed to prevent jackknifing or have caused bending, rupture, or other damage to adjacent parts of the vehicles due to the great stresses involved.

An object of the present invention therefore is to provide a new and improved pivot limiting assembly or device in which the cooperative parts thereof do not require that they be connectors between a towing and towed vehicle.

Another object of the invention is to provide a new and improved safety device for the prevention of jackknifing which device may be displaced out of line of contact when it is desired to greatly widen the angle of pivot or turning between the vehicles for parking, docking or other low speed maneuvering.

A still further object is to provide a new and improved pivot limiting assembly for use in combination with a towing vehicle and a towed vehicle, using stop blocks or bumpers, in which much of the force of impact between the stop blocks is dampened, dissipated, or transmitted but without loss of the pivot limiting capabilities of the stop blocks and without damage to adjacent parts of the vehicles.

An additional object is to provide a new and improved pivot limiting assembly including provision for transmitting the force on contact between cooperative parts of the assembly to diagonally opposite rear portions of the towed vehicle in order to offset the angular momentum imparted to such rear portions in the normal circumstance giving rise to jackknifing.

Briefly stated, the invention in one form thereof comprises, for use in combination with a towing vehicle and a towed vehicle pivotally connected in tandem, a first pair of support members mounted one on each side of the rear portion of the towing vehicle, a first pair of stop blocks resiliently mounted one on each of the support members, a second pair of stop blocks supported one on each side of the forward portion of the towed vehicle and positioned to contact one of the first pair of stop blocks when the angle of pivot between the vehicles has reached a predetermined limit, the support members together with the stop blocks thereon being movable out of the line of contact with the second pair of stop blocks whereby the angle of pivot may exceed the predetermined limit.

The features of the invention which are believed to be novel are set forth with particularity in the claims appended to and forming a part of this specification. The invention, however, both as to its operation and organization, together with further objects and advantages thereof, may best be appreciated by reference to the following detailed description taken in conjunction with the drawings, in which:

FIG. 1 is a perspective view of a tractor and semi-trailer unit embodying the pivot limiting assembly of the invention, with the superstructure of the trailer removed to reveal the underlying assembly;

FIG. 2 is a top plan view of a tractor-trailer showing a pivot limiting assembly of the invention;

FIG. 3 is an elevational view of a portion of a pivot limiting assembly of the invention, the view being from the rear of the trailer component of a tractor-trailer;

FIG. 4 is a section taken along line 4—4 of FIG. 3;

FIG. 5 is a top plan view of a portion of the pivot limiting assembly of FIG. 3;

FIG. 6 is an elevational, partially fragmentary, section, taken along line 6—6 of FIG. 1, of a cross-over connection of force transmitting means;

FIG. 7 is an elevational view, partly in section, of another form of a crossover connection of force transmitting means;

FIG. 8 is a top plan view of a portion of a tubular force transmitting means at the point of connection with the frame of a towed vehicle;

FIG. 9 is a section taken along line 9—9 of FIG. 8;

FIG. 10 is a schematic of a hydraulic system for use with the pivot limiting assembly of the invention;

FIG. 11 is a top plan view of another pivot limiting assembly of the invention;

FIG. 12 is a top plan view of a portion of still another pivot limiting assembly of the invention;

FIG. 13 is a top plan view of another arrangement embodying the invention with the trailer shown only in outline;

FIG. 14 is a side elevation of a portion of FIG. 13;

FIG. 15 is a front elevation of the trailer mounted stop assembly of FIGS. 13 and 14; and FIG. 16 is a section seen in the plane of lines 16—16 of FIG. 15.

With reference to FIG. 1, there is illustrated a towing and towed vehicle tandem combination 15 comprising a towing vehicle such as tractor 16, a towed vehicle such as semi-trailer 17, and a hitch such as a "fifth wheel" 18. The hitch 18 is pivotally mounted on a platform 19 and is adapted to receive a pin connection (not shown in FIGS. 1 and 2) from the towed vehicle. Trailer longitudinal side frames 21 and transverse rear U-channel reinforcing member or beam 22 comprise other conventional elements in a tractor trailer underframe structure useful for an understanding of the present invention. As part of the usual tractor frame or as an added member, is a U-channeled beam 23 which is normally welded to tractor frame 20. Movably mounted on each end of U-channeled beam 23 are support members 25 and 26, preferably of the same U-channeled construction as beam 23, and serving as extensions of beam 23. Support members 25 and 26 are supported by hinges 45a and 45b (as shown in FIGS. 3 and 5 with respect to member 25) to permit support members 25 and 26 to swing upwardly for purposes hereinafter made apparent.

Cooperating trailer mounted stop block plates or bumpers 35 and 36, as illustrated in FIG. 1, are connected to force transmitting means such as shafts or tubular members 37 and 38. Members 37 and 38 pass through slots (unnumbered) in transverse reinforcing members 24a and 24b and are loosely held together at a cross-over point 40. Tubular members 37 and 38 are connected to trailer frame 21 at points 41 and 42 as described in greater detail hereinafter.

The assembly of the invention further comprises reinforcing struts or gusset-like members 27a and 27b, as more clearly shown in FIG. 5. These struts are preferably welded or bolted to support members 25 and 26 and operate to resist forward movement of support members 25 and 26 as hereinafter described. Means for lifting the support members 25 and 26 such as hydraulically-operated cylinders 29 and 30, as shown in FIG. 3, are mounted at fulcrum 32, on member 23 with the pistons 31 thereof being connected to support member 25 at pivot point 25a. Alternatively, the support members 25 and 26 may be arranged to pivot downwardly, if required by clearance considerations.

As shown in FIG. 4, a pivot limiting assembly of the invention includes a stop block, preferably in the form of a heavy steel plate of bumper 33, attached to a shaft 47. The shaft passes through apertures 43 and 44 of member 25 and has affixed thereto holding means such as an abutment plate 49 and pin 50. Resilient means such as a spring 52 is positioned between an abutment plate 51 on support member 25 and a flanged holder 53 on the back surface of plate 33. As generally indicated in FIGS. 1 and 2, support member 26 and stop block plate 34 correspond in construction to the foregoing. Completing the pivot limiting assembly are mating stop blocks such as plates or bumpers 35 and 36, supported on trailer frame 21 independently of tractor frame 20.

FIG. 6 shows one embodiment of construction at the point 40 of cross-over of the tubular members 37 and 38. In this figure, tubular members 37 and 38 are connected by nut and bolt combination 40a which seats loosely in holes cut through the tubular members. In an alternate cross-over construction, shown in FIG. 7, a tubular member 58 is broken and the two sections bolted or welded to a bridging member 59 which provides an elongated aperture to loosely receive a second tubular member 57 therethrough. The cross-over construction, whether of the type of FIG. 6, FIG. 7 or otherwise, should be sufficiently loose about the cross-over point so that a load applied to one of the tubular members is not transmitted to the other. If desired, shock absorbing material may be employed to separate the force transmitting means at the cross-over point, such as rubber pads or bands, bonded rubber layers, or the like.

FIG. 8 shows the construction at the point of attachment 42 of a force transmitting tubular member 37. As illustrated, a right angle plate 60 abuts the joint of trailer frame 21 and transverse rear U-channeled reinforcing beam 22. Tubular member 37 then is welded or otherwise affixed, as by bolts, at point 42. Similarly, tubular member 38 is affixed to trailer frame 21 and beam 22 at point 41.

As shown in FIG. 9, member 38 may meet right angle plate 60 below trailer frame 21. This positioning will occur when the construction of FIG. 6 is utilized. However, the point of contact 42 will be higher, or closer to the underside of the trailer superstructure, with the bridged construction of FIG. 7.

FIGS. 11 and 12 illustrate alternate embodiments of pivot limiting assemblies and the use therein of stop blocks generally corresponding to stop block plates 34 and 35 of the preceding figures. With reference to FIG. 11, support member comprising a U-channeled beam 78 is fixed transversely of trailer frame 21 at a forward position on the trailer frame such that, when tractor 16 is pivoted relative to trailer 17, one pair of stop blocks will meet, as illustrated by the discontinuous superposed portion of FIG. 11. With reference to FIG. 11 it will be seen that the construction of each stop block mounted on transverse beam 78 is similar to that of stop blocks 33 and 34. Thus, there is provided as stop blocks heavy steel plates 79 and 80 supported on flanged holders 81 and 82, and shafts 83 and 84 mounted on the holders. Springs 85 and 86 encircle shafts 83 and 84 and abut annular supports 87 and 88. Shafts 83 and 84 are affixed to beam 78 by plates 89 and 90 and locking pins 91 and 92. The angle of fixture of resiliently mounted stop blocks 79 and 80 to beam 78 is such as to provide mating with corresponding plates 33 and 34 at the limiting angle of contact.

The embodiment illustrated in FIG. 12 eliminates transverse beam 78 of FIG. 11 in favor of angled support member 96 and support strut 101, each solidly affixed to trailer frame 21. In other respects, the stop block assembly is essentially the same as in FIG. 11, comprising a stop block such as heavy steel plate 93 mounted on shaft 95 and held thereon by plate 98 and locking pin 99. Similarly, spring 100 mounted on shaft 95 is held in place by holder 94 and abutment plate 97.

In operation, as best shown in FIG. 2, the angle of pivot T is governed by the relative positions of stop blocks 33, 34, 35 and 36. As employed herein, "angle of pivot" means the angle which either towing or towed vehicle is displaced from the longitudinal axis passing through towing and towed vehicle, and is identified as angle "T" in FIG. 2. When the limiting angle of pivot is approached, a stop block supported by the trailer will contact a corresponding stop block mounted on the tractor, the mating of which prevents further pivoting. The resilient mounting of each pair of stop blocks reduces or dampens the force of impact of the stop blocks so as to prevent sudden shock and possible damage to the vehicles as well as discomfort to the tractor driver. It has been determined that the preferred limiting angle of pivot is about 15°–20°, this being about the maximum angle of pivot required to make most turns while the vehicles are moving at moderate or high speed. Of course, the allowable angle of pivot may be set in accordance with the dimensions and characteristics of the vehicles and the required usage thereof. In most cases jackknifing normally will not occur until the angle of pivot has exceeded 15°–20°. Preferably, hinges 45a and 45b are loosely hung to relieve undue stress on them upon the mating of stop blocks, the major stress being taken by the resilient mountings and by the frictional engagement of struts 27a and 27b with frame 20.

With reference to FIGS. 1 and 2, it will be noted that the force of impact of the pairs of stop blocks is also transmitted to a diagonally opposite end portion of trailer frame 21, the end points 41 and 42 preferably being just forward of the rear wheels of the towed vehicle. It will be apparent that the transmitted force counteracts the movement or angular momentum of the rearward portion of the trailer in the opposite direction, this being the normal occurrence in a jackknifing situation. Accordingly, the cooperation of stop blocks 35 and 36 with tubular members 37 and 38 to further stabilize the two vehicles against jackknifing is thus apparent.

When it is desired to park or dock the tandemly connected vehicles, the angle of pivot must necessarily substantially exceed the angle determined by the preset position of the stop blocks. Accordingly, retraction of members 25 and 26 is provided by the hinged connections of support members 25 and 26 to member 23. With reference particularly to FIGS. 3 and 5, it will be noted that support member 25 is swung upwardly on hinges 45a by hydraulic cylinder 29 and piston 31.

If desired, the hinges may be positioned elsewhere so as to permit the support members 25 and 26 to swing in a different direction, for example, below the plane of beam 23 or inwardly of frame 20. In place of hinges, support members 25 and 26 may slide on rails or may be geared to move in any direction effective to displace support members 25 and 26 from a pivot limiting position. Known mechanisms can be employed for this purpose, such as rack and pinion gearing.

FIG. 10 shows a convenient system for operating hydraulic cylinders 29 and 30. An electric circuit 70 including an electric motor 70a operates a pump 71, which pump employs hydraulic fluid from a reservoir 72 to activate cylinders 29 and 30 in the direction governed by a valve 73. The valve 73 is provided with an operating lever or knob (not shown) for selection of its operative position. This hydraulic system may be integrated into an existing hydraulic system or may be adapted to the vehicle as an auxiliary system.

Other lifting means may be employed in place of the hydraulic system. For example, by suitable counterbalancing of support members 25 and 26, mechanical levering may be utilized.

The arrangement shown in FIGS. 13 – 16 are adaptable for the so-called tenwheel type tractor in which the tractor is provided with two rear axles each mounting two wheels and the trailer overlaps the end of the tractor by a substantial distance. The tractor 103 includes side frame members 104 and 105 and an end frame member 106. A fifth wheel 107 is mounted intermediate the end frames on a conventional support member or platform 108 to which the fifth wheel 107 is pivoted as indicated at 109. A trailer 110 carries a mating fifth wheel disc or hitch 111. Also mounted to the underneath of the trailer is an arrangement comprising a member 112 which extends transversely across the width of the trailer and has two bumpers or blocks 113 and 114 mounted thereto as by means of bolts 115, welding or other suitable connections. Mounted to the tractor across frame members 104 and 105 is an assembly which comprises a base member 116 connected to frame members 104 and 105 as by welding or any combination thereof. The assembly 116 further comprises bumper assemblies 117 each comprising a cylindrical or tubular member 118 having a bumper surface 119 which are in a movable housing or support member 120. A spring 121 biases the bumper surface 119 forward until the rear plate 122 engages member 125 or the spring bottoms. The movable housings 120 are slidable with respect to a main housing 123, which is reinforced against movement with respect to base 116 by gusset plates 124.

Each of the housings 120 is movable in and out in a path defined therefor by housing 123 including flanges 123a and 123b. Movement is effected by means of a hydraulically operated piston as previously exemplified in FIG. 10.

Positioned on base 116 are upstanding reinforcing plates 125 arranged to act as a stop for the bumper assemblies 117 just as or prior to the spring 121 bottoming. The upstanding surfaces 126 of members 125 are adapted to be engaged by the rear plates 122 of the assemblies 117.

As more clearly shown in FIGS. 13 and 15, the bumper assemblies 117 are in an operative position to limit angular movement of the trailer 110 with respect to the tractor 103. If the angular movement exceeds a predetermined value as previously described, the stops 114 will engage surface 119 and bumper assemblies 117, compress spring 121 which is very stiff to control the rate of application of force until guide plate 122 engages upstanding portion 126. At this time, the angular position of the trailer with respect to the tractor is fixed at a maximum value.

Each of the tubular members 118 has an elongated opening 128 defined therein into which extend the rod 129 of a piston 130. Affixed to the end of rod 129 is yoke-like member 131 which carries a pin or rod 132. Rod 132 may slide within a large guide rod 133 affixed diametrically across member 118. Rod 133 has an aperture therethrough receiving pin 132. With this construction the bumper assembly 117 may move and the connection of rod 129 thereto maintained.

With this construction it will be seen that when piston rods 129 extend from the cylinders 134, bumper assemblies 117 are moved to a position where they will not be engaged by the stop blocks 113 and 114 on the trailer. This will permit low speed maneuvering and move the bumpers out of position where they might interfere with coupling of the tractor to the trailer when it first backs up to receive the trailer on the fifth wheel 107.

The actuation of the hydraulic cylinders 134 with piston 130 may utilize the same control circuitry shown in FIG. 10 and no further explanation of the operation thereof is required.

As indicated, an important advantage of the invention is the absence of direct connection of the stop blocks of the towing vehicle to the stop blocks of the towed vehicle and the ability to move the tractor stop blocks from a pivot limiting position, thus eliminating the expense and inconvenience of known anti-jackknifing devices which normally require means for directly connecting the antijackknifing assembly between the two vehicles.

It will thus be seen that the objects set forth above, among those made apparent from the preceding description, are efficiently attained. Since changes may be made in the constructions set forth without departing from the spirit and scope of the invention, it is intended that all matter contained in the above description and shown in the accompanying drawings shall be interpreted as illustrative and not in a limiting sense.

What is claimed is:

1. For use in combination with a towing vehicle and a towed vehicle pivotally connected in tandem, a pivot limiting assembly comprising a first and second spaced apart support member mounted on the towing vehicle on opposite sides of the longitudinal center line thereof, a bumper member carried on each of said support members, a pair of stop blocks supported one on each side of the forward portion of the towed vehicle and each positioned to contact one of said bumper members when the angle of pivot between the vehicles has reached a predetermined limit, and means for moving said support members to and from a pivot limiting position.

2. The pivot limiting assembly of claim 1 wherein said bumpers are resiliently mounted on said support members.

3. The pivot limiting assembly of claim 1 wherein each of the stop blocks are connected by force transmitting means to diagonally opposite rear portions of said towed vehicle.

4. The pivot limiting assembly of claim 3 wherein said force transmitting means comprises tubular members which cross over each other, the point of crossover being established when the angle of pivot is zero.

5. The pivot limiting assembly of claim 1 including a channeled member mounted transversely of said rear portion of the towing vehicle, said support members being extensions of said channeled member.

6. The pivot limiting assembly of claim 1 wherein said bumpers are hinged to swing upwardly of the rear portion of the towing vehicle, and including hydraulic lifting means for said support members.

7. The pivot limiting assembly of claim 1 including a second pair of support members fixed on the forward portion of said towed vehicle and disposed on opposite sides thereof, said stop blocks being resiliently mounted, one on each of said second support members.

8. The pivot limiting assembly of claim 7 wherein each stop block comprises a steel plate and a shaft connected to said plate, said shaft passing through an aperture in
the support member upon which said plate is mounted, said assembly including spring means mounted on said shaft, abutting means on said shaft for said spring means, and means on the end of said shaft for holding said shaft in said aperture.

9. The pivot limiting assembly of claim 1 wherein each bumper comprises a steel plate and a shaft connected to said plate, said shaft passing through an aperture in the support member upon which said plate is mounted, said assembly including spring means on said shaft between said plate and said support member, and means on the end of said shaft for holding said shaft in said aperture.

10. The pivot limiting assembly of claim 1 including a support member fixed transversely of said forward portion of said towed vehicle, said stop blocks being resiliently mounted on said support member.

11. The pivot limiting assembly of claim 10 wherein each stop block comprises a steel plate and a shaft connected to said disc, said shaft passing through an aperture in said third support member, said assembly including spring means mounted on said shaft, abutting means on said shaft for said spring means, and means on the end of said shaft for holding said shaft in said aperture.

12. The assembly of claim 1 further comprising a housing member mounted to said towing vehicle, said support members being movable linearly in said housing means to and from pivot limiting positions.

13. The assembly of claim 1 wherein said support members are pivotally mounted to the towing vehicle and said means for moving is effective to pivot said support means to and from a pivot limiting position.

14. The assembly of claim 1 wherein said support members are mounted to the towing vehicle in front of the point of connection of the towing vehicle to the towed vehicle.

15. The assembly of claim 1 wherein said support members are mounted to the towing vehicle behind the point of connection of the towing vehicle to the towed vehicle.

* * * * *